United States Patent [19]
Peterson

[11] Patent Number: 4,886,331
[45] Date of Patent: Dec. 12, 1989

[54] THERMO-OPTICALLY INDUCED WAVEGUIDE

[75] Inventor: Lauren M. Peterson, Ann Arbor, Mich.

[73] Assignee: Environmental Research Institute of Michigan, Ann Arbor, Mich.

[21] Appl. No.: 169,316

[22] Filed: Mar. 17, 1988

[51] Int. Cl.$^4$ ................................................ G02B 6/10
[52] U.S. Cl. ............................... 350/96.12; 350/96.13; 350/96.15; 350/354
[58] Field of Search ............... 350/96.13, 96.14, 96.15, 350/96.12, 354

[56] References Cited

U.S. PATENT DOCUMENTS

| | | | |
|---|---|---|---|
| 3,639,854 | 2/1972 | Baldwin | 350/354 X |
| 3,837,728 | 9/1974 | Logan et al. | 350/96.13 |
| 4,208,667 | 6/1980 | Chang et al. | 350/354 X |
| 4,382,660 | 5/1983 | Pratt, Jr. et al. | 350/354 X |
| 4,626,075 | 12/1986 | Chemla | 350/354 |
| 4,693,547 | 9/1987 | Soref et al. | 350/96.15 X |
| 4,716,449 | 12/1987 | Miller | 350/354 X |

Primary Examiner—Frank Gonzalez
Assistant Examiner—John Ngo
Attorney, Agent, or Firm—Krass & Young

[57] ABSTRACT

A waveguide created by thermo-optically induced changes in the refractive index of a medium resultant from absorption of light focused thereupon. The medium absorbs optical energy of a preselected wavelength to cause a refractive index change in response thereto. A pulsed optical switch beam of the preselected wavelength is focused on the medium. The switch beam has an energy level adapted to create an optically induced focal region waveguide therethrough. An optical probe beam is focused on the medium and angularly offset with respect to the pulsed beam. The probe beam is optically confined within the waveguide to emerge from the medium as a diverging, cone-shaped beam.

26 Claims, 2 Drawing Sheets

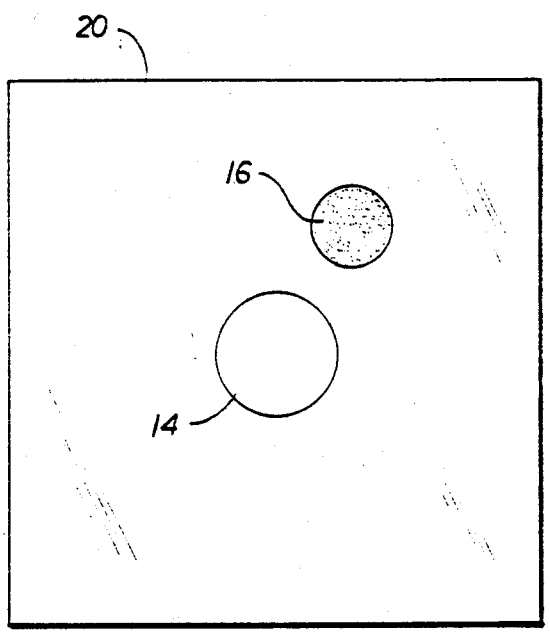
FIG. 3
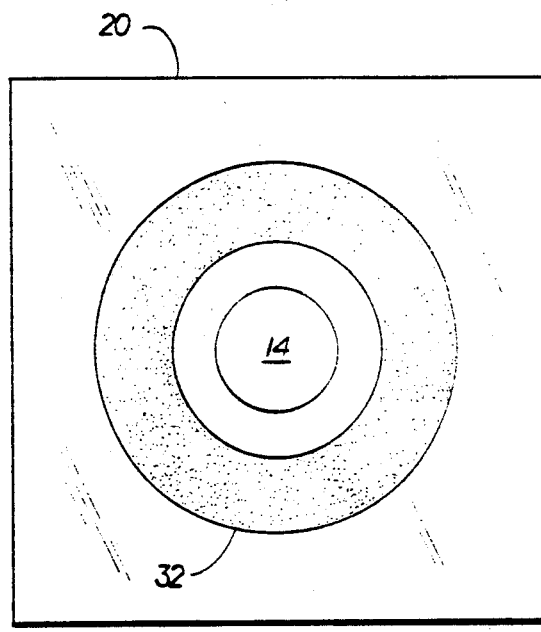
FIG. 4
FIG. 5
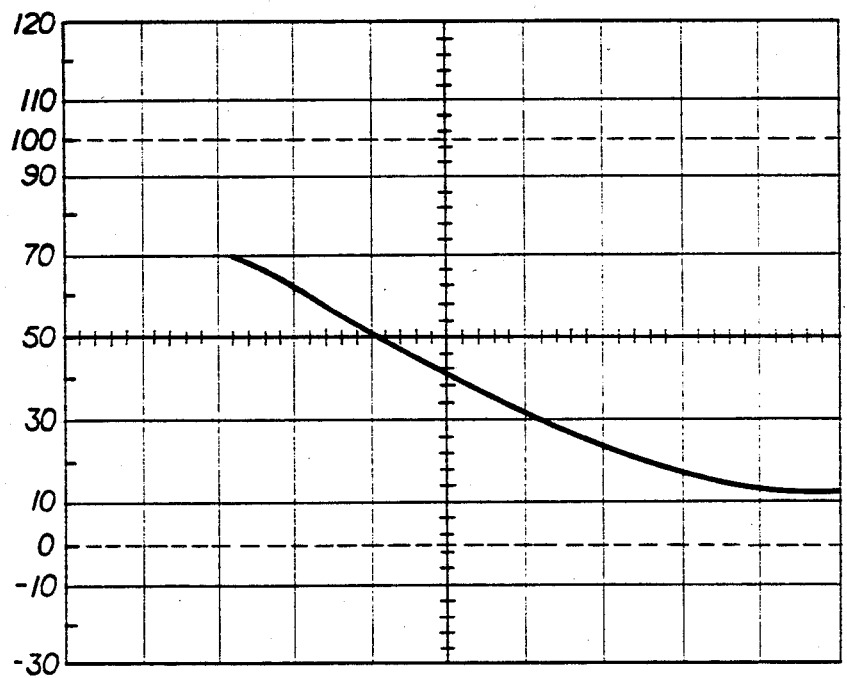

THERMO-OPTICALLY INDUCED WAVEGUIDE

This invention was made with Government support under F49620-84-C-0067 awarded by the Air Force. The Government has certain rights in this invention.

BACKGROUND OF THE INVENTION

1. Field of the Invention

This invention relates to the field of optical waveguides, and more particularly, to a waveguide created by thermo-optically induced changes in the refractive index of a medium resultant from absorption of light focused thereupon.

2. Review of the Relevant Prior Art

The use of optical waveguides for directing the path of an optical beam has long been known in the prior art. In recent years, such waveguides have typically appeared in the form of "optical fibers" which may utilize the phenomenon of total internal reflection to confine light to a preselected path bounded by an interface between media with differing refractive indices. Aternatively, such fibers may employ a graded refractive index, referred to as a "grin" to direct light in a sinusoidal path down the length of the fiber, th graded index of refraction serving to bend the light to prevent it escaping the fiber. Such optical fibers have become increasingly important in such fields as communications since they provide a relatively low cost, easy to manufacture method of low energy, high speed transfer of information.

It is expected that devices employing optical energy, either alone or in combination with electrical energy, will come into increasing use. For example, while most conventional computers are actuated by electrical energy, it has become increasingly obvious that such electronic computers are limited in the speed at which information may be processed primarily due to the relatively slow path of the electrons through their conductive paths.

It has been proposed that components employing optical switching and transmission of information could partially or entirely replace the electronic components of such computers, with an anticipated improvement in operational speeds in a range of orders of magnitude. Unlike electrons traveling through a conductor, optical energy in a linear medium does not effect the optical energy in an adjacent medium, and, therefore, should enable greater packing densities of interconnects without cross-talk than can be achieved by electronics; furthermore the bandwidth of an optical signal is very high, enabling a given signal to carry large amounts of information.

It has long been observed that radiation passing through a non-linear optical medium can lead to a change in the refractive index of that medium. If the radiation is in the form of a focused Gaussian beam, the focal region where the radiation field is the strongest will have the greatest index change and the transverse spatial profile of this index change will be bell-shaped since the transverse radiation profile is also Gaussian. For a large F-number, focused beam impinged upon a nonlinear medium, wave mechanics dictate that the focal region is a long cylinder with a transverse graded index (GRIN) quite analogous to a graded index waveguide or fiber. Similarly, by focusing a beam having the appropriate (Bessel function) transverse field distribution onto an appropriate medium, a cylindrical channel analogous to a conventional step-index fiber may be induced.

In U.S. Pat. No. 4,585,301, a transverse radiation profile approximating a prism is created in a absorptive medium by use of a carbon dioxide laser emitting a beam having a wavelength of 10.6 microns at an energy level of 0.1 joules for a duration of 1.7 nanoseconds. Under these conditions, a thermal gradient in the shape of a prism, or a thermal lens is created in the absorptive medium due to thermal changes created by the optical energy. A signal beam is inputted into the medium parallel to the control beam and is angularly deflected as it passes through the thermal lens. By varying the energy of the control beam, the slope of the thermal gradient or lens is correspondingly varied to cause either greater or lesser deflection as desired.

It is important to note that in the optical prism device described in the above-referenced U.S. application, while the signal beam is angularly deflected after passing through the medium, it undergoes no change in size or area. That is, if it enters the medium as a small beam, it will emerge therefrom as a single small beam. Because of this one-to-one size relationship between incident beam and deflected beam, the prism device disclosed in this patent is not suitable for some applications. For example, in many instances it is desirable to have a single incident beam control or "turn on" a number of secondary switches in a cascading or series effect. The small, circular beam deflected by the prism cannot be readily employed in this manner since it is difficult to split up. Furthermore, in order to create the proper thermal gradient necessary to give rise to the thermal lens or prism, a relatively long duration of time for the switch beam to act on the absorptive medium is necessary, i.e., on the order of 170 nanoseconds. Hence, the switching time of this prism device is considerably slower than that of a conventional electronic switch, whose switching time may be on the order of nanoseconds.

It would be desirable to provide a means of thermo-optically creating and controlling a waveguide in a partially absorptive medium whereby an optical beam could be guided through said medium, in a manner analogous to present fiber optic devices.

It would be highly desirable to optically guide such an optical beam through such a medium such that the guided beam emerges as a diverging, cone-shaped beam, which way be split into a number of secondary beams to control multiple switches simultaneously.

It would also be highly desirable for the operating speed of such a thermo-optical waveguide to be as good as or better than conventional electronic switches. A device of this type would have significant utility in the fabrication of optical switching systems such as optical computers, communication networks and a variety of electro-optical devices.

SUMMARY OF THE INVENTION

The present invention contemplates a thermo-optically induced refractive index waveguide. A medium is provided which is at least partially absorptive of optical energy and whose refractive index changes in response to absorbed optical energy. A pulsed optical switch beam of a preselected wavelength is focused onto the medium. The switch beam has an energy level adapted to create a channel of illumination through the medium, the channel being characterized by an index of refraction differing from the index of refraction of the remainder of the medium. An optical probe beam is focused onto the medium at an angle with respect to the switch beam. Due to the channel created by the switch beam, the probe beam will be guided through the channel and confined thereto to emerge from the medium as a diverging, cone-shaped beam. If a means, such as a screen, is provided for displaying the two beams after they have passed through the medium, the diverging probe beam will appear as an annulus surrounding the central switch beam.

The at least partially optically absorptive medium is, typically, a solid, liquid or even gas to which dyes have been added to make the medium optically dense if the medium itself is not sufficiently absorptive. Refractive index changes are induced by absorption of radiation from the switch beam, typically a pulsed laser beam, followed by rapid (approximately $10^{-10}$ seconds) thermalization of the energy. While the redirection or switching of the probe beam may be accomplished in time periods on the order of $10^{-8}$ seconds or shorter, the redirected probe beam will remain in that state long after the switch beam has been turned off. The persistence of the induced waveguide effect is due to the thermal diffusion rate for the liquid being used and represents the equilibration of the temperature gradient in the focal region of the waveguide. Hence, the redirected probe beam may remain in that state for $10^{-3}$ seconds or more. While this "memory" effect may be useful in some applications, it is also anticipated that certain applications will require a much faster switch-off rate. It is believed that a second control beam inputted into the medium at a different angle could be used to switch off the probe beam in times comparable to the switch-on tires.

It has been found that the thermo-optically induced beam guide may be created in the medium by a pulsed laser beam. The pulsed laser beam is focused by a lens to produce in the medium a graded index of refraction with a cylindrical focal region. The probe beam will be confined to the cylindrical region due to the graded index of refraction, and will travel down the length of the focal region in a sinusoidal path, as in a typical GRIN waveguide.

Alternatively, a pulsed laser beam may be produced with a sharply stepped energy profile, referred to as a "step index." In this embodiment, an interface will be created in the medium between a region of high refractive index and one of low refractive index. The angled probe beam will be internally reflected off this interface and be guided down the length of the waveguide, to emerge from the medium as a diverging, cone-shaped beam.

BRIEF DESCRIPTION OF THE DRAWINGS

The various features, uses and advantages of the herein invention may best be understood with reference to the following detailed description and drawing in which:

FIG. 3 is a detailed view of the beams displayed on the screen when the device is in the condition shown in FIG. 1;

FIG. 4 is a detail view of the screen of FIG. 2 displaying the redirected probe beam; and FIG. 5 illustrates the amount of probe radiation which is redirected as it decreases over time following the duration of the pulsed, switch beam.

DETAILED DESCRIPTION OF THE PREFERRED EMBODIMENT

Throughout the following detailed description, like reference numbers are used to refer the same element of the herein invention shown in multiple embodiments thereof.

Figure 1:
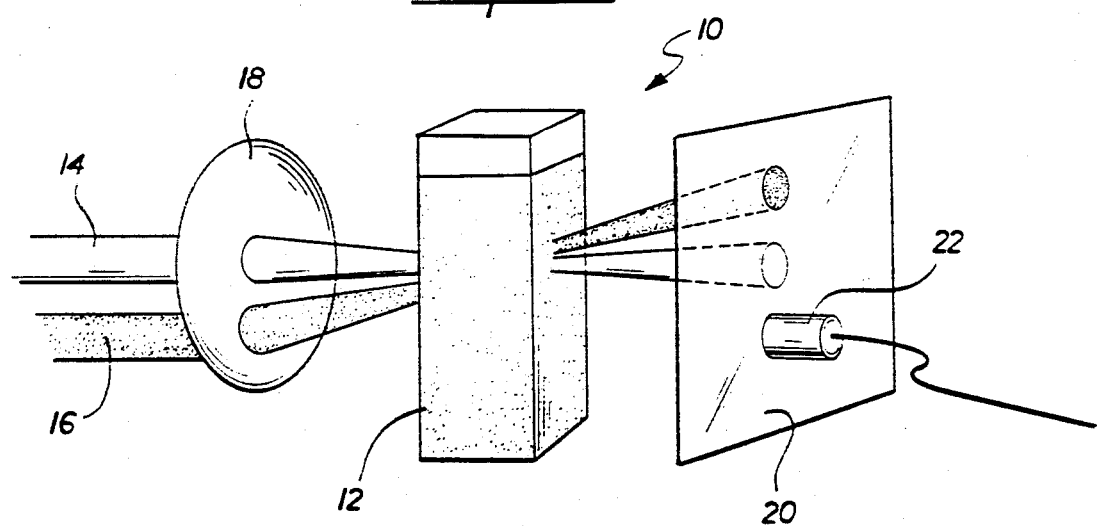
FIG. 1 is a schematic diagram illustrating the device of the present invention before redirection of the probe beam.
Figure 2:
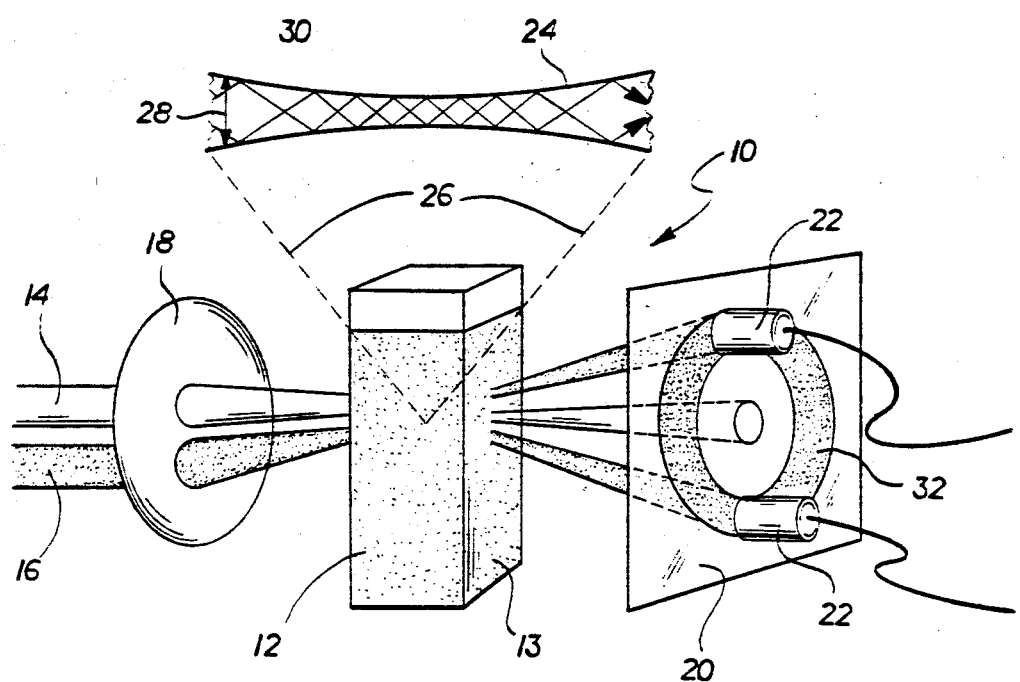
FIG. 2 is a schematic drawing of the device of FIG. 1 after the probe beam has been redirected.

Referring now the drawing and in particular to FIGS. 1 and 2, there is depicted a thermo-optical switch 10 constructed in accordance with the principals of the instant invention. The thermo-optical switch 10 comprises a liquid dye cell 12. While a liquid mechanism is used in this embodiment, it is to be understood that a suitable solid or gaseous medium could equally well be utilized. In FIG. 1, the liquid dye cell 12 contains no optical absorber, whereas in FIG. 2, an optical absorber 13 has been added to the liquid dye cell 12, thereby making the refractive index thereof thermally responsive to absorbed optical energy.

A pulsed optical switch beam 14 of a wavelength preselected to cause refractive index changes in the liquid dye cell 12 is focused thereon by means of lens 18. Since no absorber is present in the liquid dye cell 12 shown in FIG. 1, the switch beam 14 will merely pass through liquid dye cell 12 without causing any refractive changes. A probe beam 16 is also focused on the liquid dye cell by means of lens 18, and is angularly offset with respect to pulsed beam 14. Hence, as may be seen in FIG. 1, in the absence of the absorber, beam 14 and beam 16 will merely cross in the focal region of liquid dye cell 12. A screen 20 placed behind liquid dye cell 12 displays the two unaltered beams 14,16, as is shown in FIG. 3. In FIG. 3, the two beams appear as two discrete spots 14 and 16. If a detector 22 is placed in the position shown in FIG. 1, no signal will be detected.

In FIG. 2, the absorber has been added to liquid dye cell 12. Hence, focusing of pulsed beam 14 on liquid dye cell 12 will cause a refractive index change in the liquid medium within a focal region 26, thereby creating the waveguide effect referenced by reference numeral 24. Due to the thermalization of the medium within liquid dye cell 12 within the focal region 26, the refractive index of region 28 lying inside focal region 26 will be substantially different from that of region 30 lying outside focal region 26.

Hence, the probe beam 16 as it enters waveguide 24, will be confined to region 28. It will gradually pass all of the way through liquid dye cell 12 to emerge as a diverging, cone-shaped beam. An annulus of light 32 will be displayed on the screen 20, as is shown in FIG. 4. The annulus 32 will surround the probe beam 14. A detector 22 which is placed anywhere within the region of the annulus 32 will detect the presence of a signal. By using multiple detectors 22, as shown in FIG. 2 or multiple optical channels in a cascading array, a plurality of switches may be simultaneously turned on by thermo-optical switch 10. Separation of the switched radiation represented by annulus 32 from the switching radiation represented by switch beam 14 is easily accomplished with spectral filter 34.

Optically induced beam-guiding has been experimentally obtained using carbon disulfide, carbon tetrachloride, acetone and methanol as solvents with iodine, eosine and cobalt nitrate as dyes. Pulsed switch beam 14 has been provided by a pulsed nitrogen laser-pumped dye laser using coumarin 500 dye. This arrangement provided 500 nanometers pumping radiation for inducing the refractive index waveguide 28. The dye laser pumped pulses were 7 nanoseconds in duration with energies on the order of 10 microjoules or less. This radiation was focused by a lens to produce a focal region approximately 500 micrometers long and 12 micrometers in diameter (full-width at half intensity). Helium neon laser radiation at 633 nanometers served as the probe beam 16 and was also focused by the lens 18. Switch-on time for the guided helium neon probe beam 14 was on the order of 10 nanoseconds. It is not known at this time whether this switching time is characteristic of the medium and the thermalization process, or if it simply represents the deposition time of the laser pulse and therefore would decrease if the laser pulse were shorter.

Once probe beam 14 has been redirected, it remains in the switched state long after the pumped beam 14 is gone. The amount of probe radiation which is guided, or the efficiency of the interaction, decreases exponentially with time following the pump pulse and has a time constant on the order of a millisecond, as is shown in FIG. 5. This is on the order of the thermal diffusion time for liquids and represents the equilibration of the temperature gradient in the focal region.

The efficiency of the beam guiding was observed to be quite high. The guided probe radiation 16 which was distributed into annulus 32 was gathered and focused by a lens onto a fast silicon PIN detector. Pump radiation was blocked using a red filter and unguided light was blocked using a spatial stop. The efficiency was found to be the greatest (93%) for carbon disulfide, with an absorption coefficient of about 3 cm.$^{-1}$. The efficiencies for the other solvents and dyes were in the 10–70% range, being lowest for the lowest laser energies.

The experimental apparatus shows that optically induced beam-guiding or switching way be induced at energy levels in the microjoule range. Switch-on times were observed to be on the order of $10^{-8}$ seconds or shorter and the switch beams persisted for as long as $10^{-3}$ seconds or more. It is anticipated that a second pump or control beam at a different angle could be used to switch off the signal or probe beam in times comparable to switch-on, although the experiments utilized pulsed switch beams and probe beams of different wavelengths, the interaction is expected to be identical for degenerate wavelengths, leaving open the likelihood of cascadable switches. Not only does the thermo-optical waveguide of the instant invention lead to rapid switching of an optical beam, but also to its redirection. This may prove to be of value in all-optical beam control, or in optical interconnects for all-optical and hybrid optical/electronic computers.

While in the experimental apparatus described, the index of refraction within the focal region is higher than that of the surrounding medium (being highest in the center of the channel), it is anticipated that thermo-optically induced waveguiding would be equally effective if the switch beam were used to create a lowered index of refraction in the focal region. Obviously, the various parameters of laser wavelength, energy level and duration and the characteristics of the absorptive medium would have to be altered to maximize this effect. Such alterations would be well within the ability of one ordinary skilled in the art of laser optics and are considered to lie within the scope of the herein invention, whose true scope is defined by the following claims.

I claim:

1. A thermo-optical waveguide comprising:
   a homogeneous medium at least partially absorptive of optical energy of a preselected wavelength and whose refractive index changes in response to rapid thermalization of absorbed optical energy;
   a pulsed, optical switch beam of said preselected wavelength focused on the medium and having an energy level adapted to change the refractive index of an illuminated portion of the medium so as to create an optically induced waveguide therethrough, the waveguide being characterized by a refractive index differing from the refractive index of the remainder of the medium; and
   an optical probe beam focused on the medium and angularly offset with respect to the pulsed beam such that the probe beam is optically confined within of the waveguide to energy therefrom as a diverging, cone-shaped beam.

2. The waveguide of claim 1 further comprising a lens.

3. The waveguide of claim 2 wherein the switch beam is focused by the lens.

4. The waveguide of claim 2 wherein the probe beam is focused by the lens.

5. The waveguide of claim 1 wherein the medium has an index of refraction which changes in response to thermal change.

6. The waveguide of claim wherein the medium is a liquid dye cell.

7. The waveguide of claim 6 wherein the liquid dye cell is comprised of a dye dissolved in a solvent.

8. The waveguide of claim 7 wherein the dye is chosen from a group consisting of iodine, eosine and cobalt nitrate.

9. The waveguide of claim 7 wherein the solvent is chosen from a group consisting of carbon disulfide, carbon tetrachloride, acetone and methanol.

10. The waveguide of claim 1 wherein the switch beam is produced by a pulsed nitrogen laserpumped dye laser.

11. The waveguide of claim 10 wherein the pumped dye laser used coumarin 500 dye.

12. The waveguide of claim 10 wherein the pumped dye laser provides a pulsed optical beam at a preselected wavelength of approximately 500 nm pumping radiation for inducing the waveguide.

13. The waveguide of claim 1 wherein the switch beam is focused by the lens to produce a focal region in a range of between 250 and 1,000 microns and the diameter in a range of between 5 and 50 microns.

14. The waveguide of claim 1 wherein the probe beam is produced by a HeNe laser.

15. The waveguide of claim wherein the probe beam has a wavelength of approximately 633 nm.

16. The waveguide of claim 1 further comprising a means for separating the probe radiation from the switch radiation after the switch beam and the probe beam have passed through the medium.

17. The waveguide of claim 16 wherein the means comprises a spectral filter.

18. The waveguide of claim 1 further comprising a means for displaying the switch beam and the probe beam after they have passed through the medium.

19. The waveguide of claim 18 wherein the display means is a screen.

20. The waveguide of claim 19 wherein the probe beam appears on the screen as an annulus surrounding the probe beam radiation.

21. The of claim 20 wherein the annulus is separated into a plurality of optical beams.

22. The waveguide of claim 21 wherein the separated plurality of beams may be used to switch a plurality of devices simultaneously.

23. The waveguide of claim 1 further comprising a second pulsed beam which is directed through the medium at an angle with respect to the switch beam which is different from the angle between the switch beam and the probe beam, said beam having a preselected energy level adapted to dissipate the waveguide.

24. The waveguide of claim 1 wherein an interface is created in the illuminated area between a region of relatively high refractive index and a region of relatively low refractive index.

25. A method of switching employing a thermo-optical switch, said method comprising the steps of:
  providing a homogeneous medium at least partially absorptive of optical energy of a preselected wavelength and whose refractive index changes in response to rapid thermalization of absorbed optical energy;
  providing a pulsed optical beam of said preselected wavelength and having energy adapted to change the refractive index of an illuminated portion of the medium so as to create an optically induced waveguide therethrough;
  providing an optical probe beam;
  focusing the switch beam on the medium to create a waveguide therethrough, the waveguide being characterized by a refractive index differing from the refractive index of the remainder of the medium;
  directing the probe beam in a direction angularly offset with respect to the direction of the switch beam;
  focusing the probe beam on the medium such that the probe beam is optically confined within the waveguide to emerge from the medium as a diverging, cone-shaped beam;
  directing the switch beam and the probe beam onto a screen; and
  separating the probe radiation from the switch radiation.

26. The waveguide of claim 1 wherein the refractive index of the illuminated portion is graded.

* * * * *

UNITED STATES PATENT AND TRADEMARK OFFICE
CERTIFICATE OF CORRECTION

PATENT NO. : 4,886,331

DATED : Dec. 12, 1989

INVENTOR(S) : Peterson, Lauren M.

It is certified that error appears in the above-identified patent and that said Letters Patent is hereby corrected as shown below:

Column 1, line 25, delete "th" and insert --the--.

Column 2, line 48, delete "way" and insert --may--.

Column 5, line 40, delete "way" and insert --may--.

Column 7, line 4, delete "The of" and insert --The waveguide of--.

Signed and Sealed this

Twenty-sixth Day of February, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO.  : 4,886,331

DATED       : December 12, 1989

INVENTOR(S) : Peterson, Lauren M.

It is certified that error appears in the above-identified patent and that said Letters Patent is hereby corrected as shown below:

Column 6, Line 20, Please delete "within of the waveguide to energy" and insert -- within the waveguide to emerge --.

Signed and Sealed this

Twenty-first Day of July, 1992

Attest:

DOUGLAS B. COMER

Attesting Officer

Acting Commissioner of Patents and Trademarks